United States Patent
Hauser et al.

(10) Patent No.: US 10,016,095 B2
(45) Date of Patent: Jul. 10, 2018

(54) SALAD SPINNER

(71) Applicant: Progressive International Corporation, Kent, WA (US)

(72) Inventors: Lawrence M. Hauser, Auburn, WA (US); Jennifer K. Cotter, Seattle, WA (US); Cole Dalton, Snohomish, WA (US)

(73) Assignee: PROGRESSIVE INTERNATIONAL CORPORATION, Kent, WA (US)

( * ) Notice: Subject to any disclaimer, the term of this patent is extended or adjusted under 35 U.S.C. 154(b) by 579 days.

(21) Appl. No.: 14/811,478

(22) Filed: Jul. 28, 2015

(65) Prior Publication Data

US 2016/0095474 A1    Apr. 7, 2016

Related U.S. Application Data

(60) Provisional application No. 62/059,543, filed on Oct. 3, 2014.

(51) Int. Cl.
*A47J 43/24* (2006.01)
(52) U.S. Cl.
CPC .................................... *A47J 43/24* (2013.01)
(58) Field of Classification Search
CPC ..................................................... A47J 43/24
USPC ......................................................... 99/495
See application file for complete search history.

(56) References Cited

U.S. PATENT DOCUMENTS

| | | | |
|---|---|---|---|
| 4,007,751 | A | 2/1977 | Commiant |
| 5,064,535 | A | 11/1991 | Hsu |
| 5,490,453 | A | 2/1996 | Mackay |
| 5,992,309 | A | 11/1999 | Mulhauser |
| 6,622,618 | B1 | 9/2003 | Glucksman |
| 2005/0204935 | A1 | 9/2005 | Siegel |
| 2010/0263555 | A1 | 10/2010 | Mah |
| 2011/0041710 | A1 | 2/2011 | Collins |

FOREIGN PATENT DOCUMENTS

FR    2711904 A1    5/1995

OTHER PUBLICATIONS

International Search Report and Written Opinion issued in corresponding International Application No. PCT/US2015/053794, dated Dec. 22, 2015, 10 pages.
Search Report issued in European Application No. 15180822.7, dated Feb. 24, 2016, 3 pages.

*Primary Examiner* — David Angwin
*Assistant Examiner* — Spencer h Kirkwood
(74) *Attorney, Agent, or Firm* — Lowe Graham Jones PLLC

(57) ABSTRACT

A salad spinner includes an outer bowl configured to hold an inner basket. The bowl and basket are each configured with a central post supported by a base structure having a pillar and a piston. A helical screw positioned within the pillar engages a drive shaft within the piston in order to rotate the drive shaft as the piston moves upward and downward with respect to the pillar. A spring biases the piston in the upward position to enable reciprocal telescoping movement.

20 Claims, 20 Drawing Sheets

SALAD SPINNER

PRIORITY CLAIM

This application claims the benefit of provisional application Ser. No. 62/059,543, filed Oct. 3, 2014, the contents of which are hereby incorporated by reference.

BACKGROUND OF THE INVENTION

There are a variety of devices for use in drying lettuce and other similar foods for making salad. In general, such devices tend to include a strainer basket which nests within a larger bowl. A lid encloses the basket within the bowl, and a pull-cord or other mechanism causes the basket to spin within the bowl in order to impart a centrifugal force and dry the lettuce. The pull-cord, however, can be difficult or awkward to use in many cases. Other salad spinners employ a ratchet or a pump mechanism to facilitate spinning, but each of the prior versions suffers from a variety of drawbacks.

SUMMARY OF THE INVENTION

The present invention relates to a salad spinner having an outer bowl and an inner basket configured to spin within the bowl. Preferably, both the basket and the bowl are each configured with a central column configured to surround a helical piston motor to drive the basket within a fixed bowl.

In one example of the invention, the piston carries a drive shaft configured to rotate within the piston. The drive shaft may include a set of ratchet teeth configured to mate with a complementary surface on a lower side of the basket so that rotation of the drive shaft causes rotation of the basket.

In one version, the piston further includes a set of peripheral teeth that engage mating teeth formed on the bowl in order to hold the bowl in a fixed position against rotation with respect to the piston.

In one example, a base structure includes a lower support and a pillar that carries the piston and drive shaft. The piston may be configured to extend and retract telescopically within the pillar. In one version, a pair of vertical slots formed in the pillar serves as guides for vertical movement of the piston within the pillar.

In a preferred version, a helical screw is secured to the support and extends upwardly into the pillar and the piston. A slot formed in the base of the drive shaft receives the helical screw and is configured to rotate the drive shaft as it moves upward and downward on the helical screw.

In one example, a coil spring is trapped between the support and the piston to urge the piston in an upward or extended position. In the illustrated version, the bowl and basket extend upwardly with the expansion of the spring and upward movement of the piston.

In some versions, a lid is supported on the bowl, with the lid including a brake. In one example, the brake includes a spring-loaded brake pad configured to be pressed downward from the lid to encounter a central portion of the basket in order to frictionally slow the spinning of the basket within the bowl.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
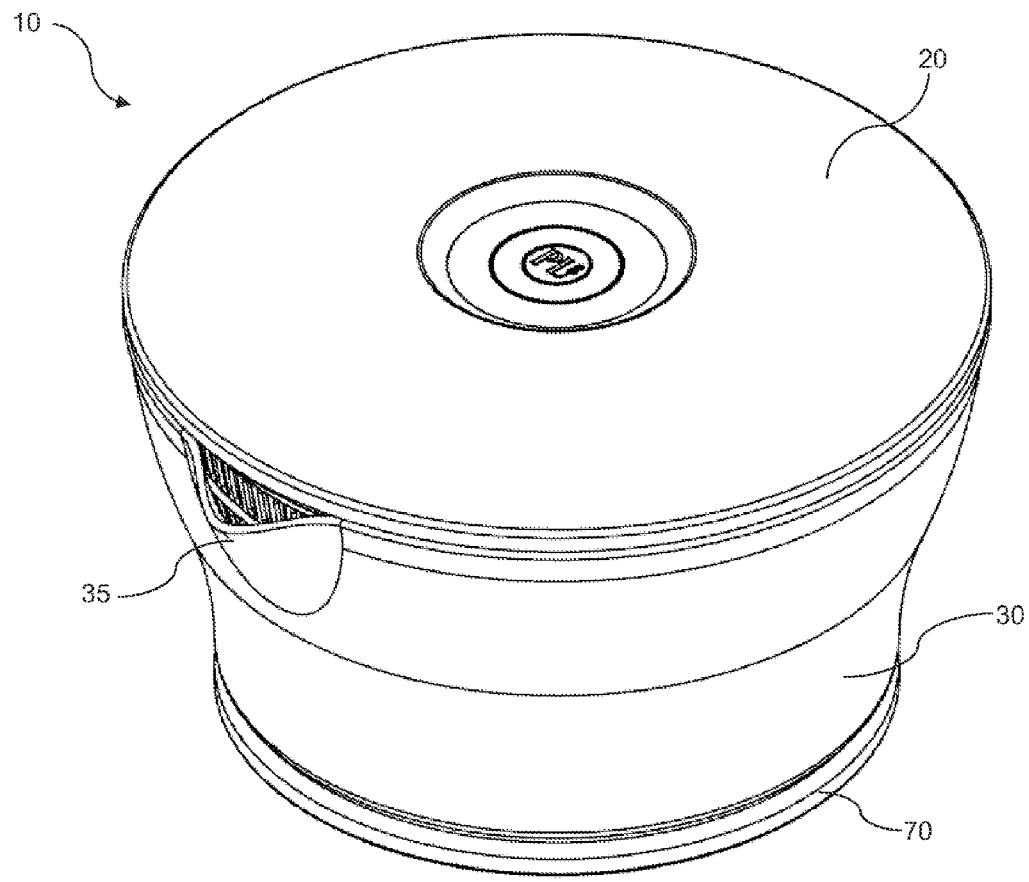
FIG. 1 is a top perspective view of a preferred salad spinner, shown with a lid attached to the outer bowl.
Figure 2:
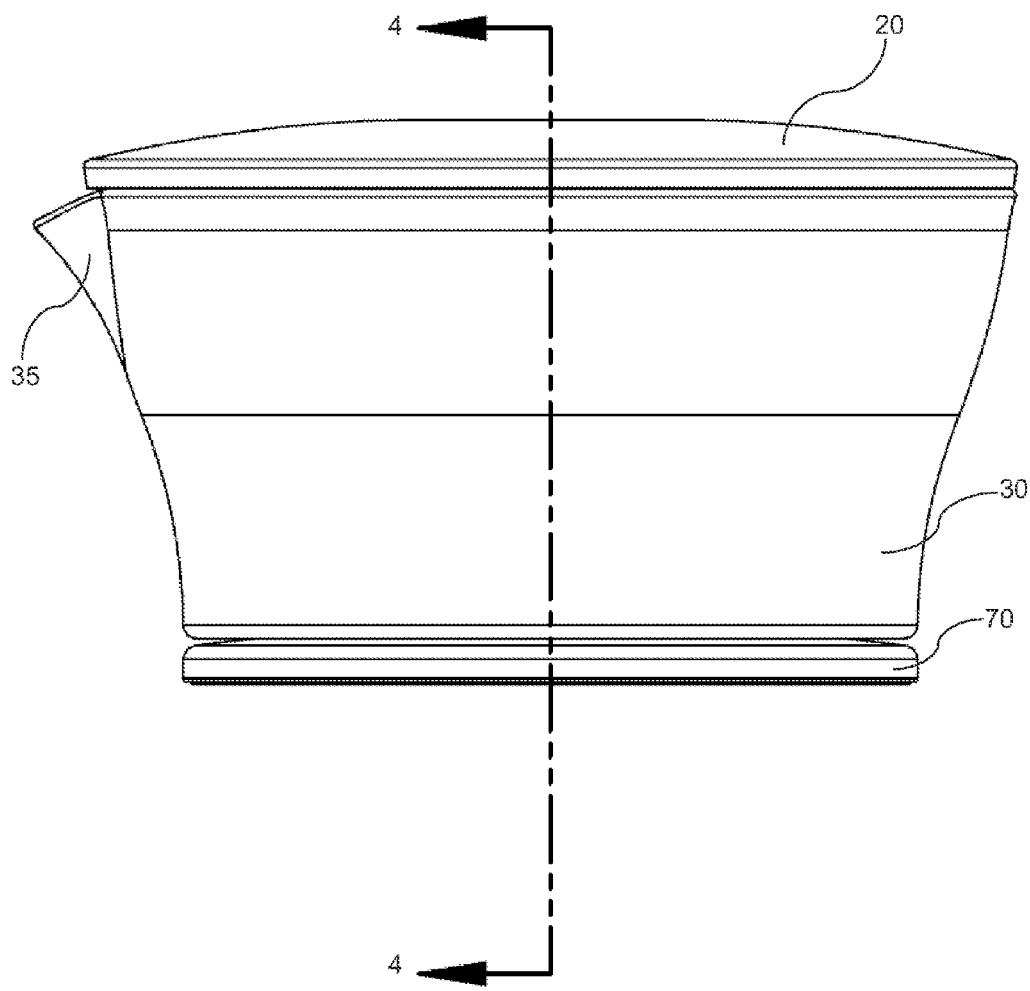
FIG. 2 is a side elevational view of a preferred salad spinner, shown with the bowl positioned downward against a lower support, and including section line 4-4.
Figure 3:
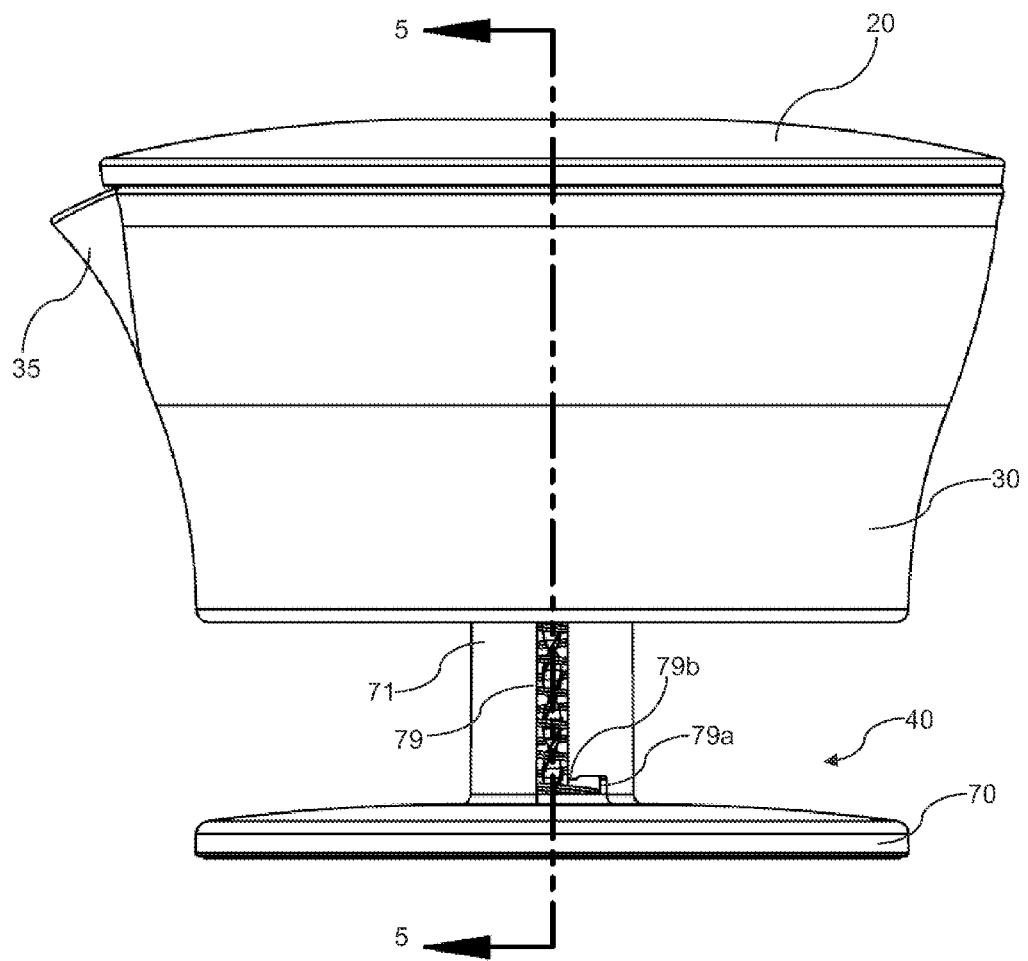
FIG. 3 is a side elevational view of a preferred salad spinner, shown with the bowl positioned upward with respect to the lower support, and including section line 5-5.
Figure 4:
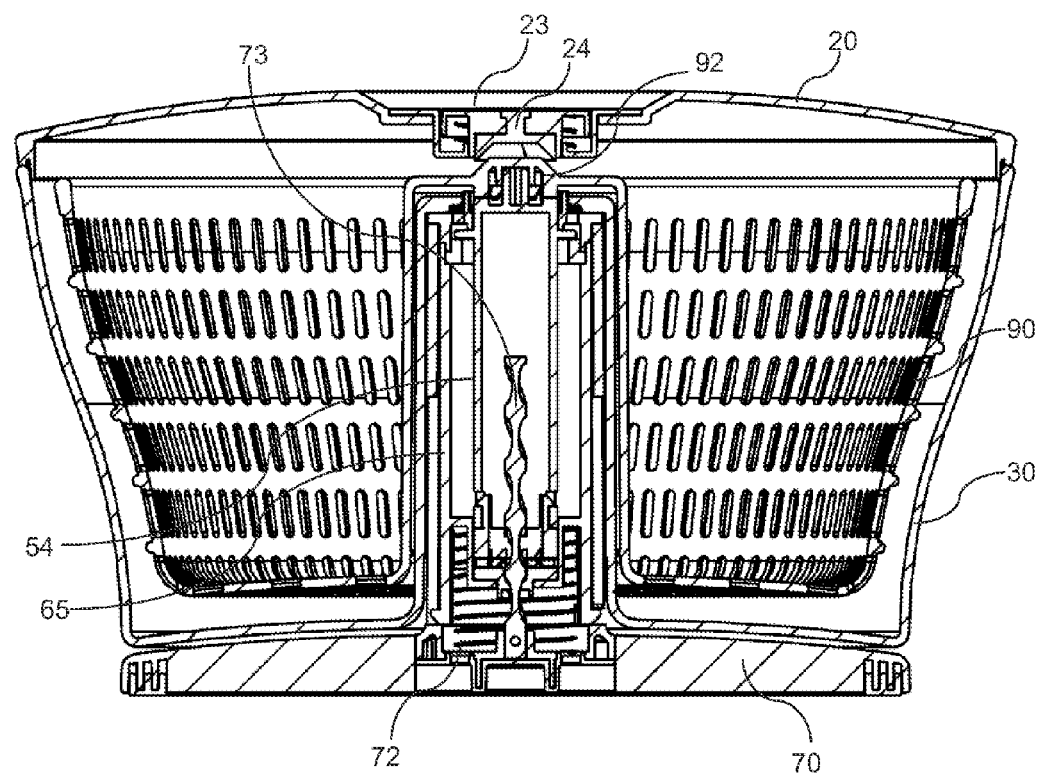
FIG. 4 is a sectional view of a preferred salad spinner, taken along section line 4-4 from FIG. 2.
Figure 5:
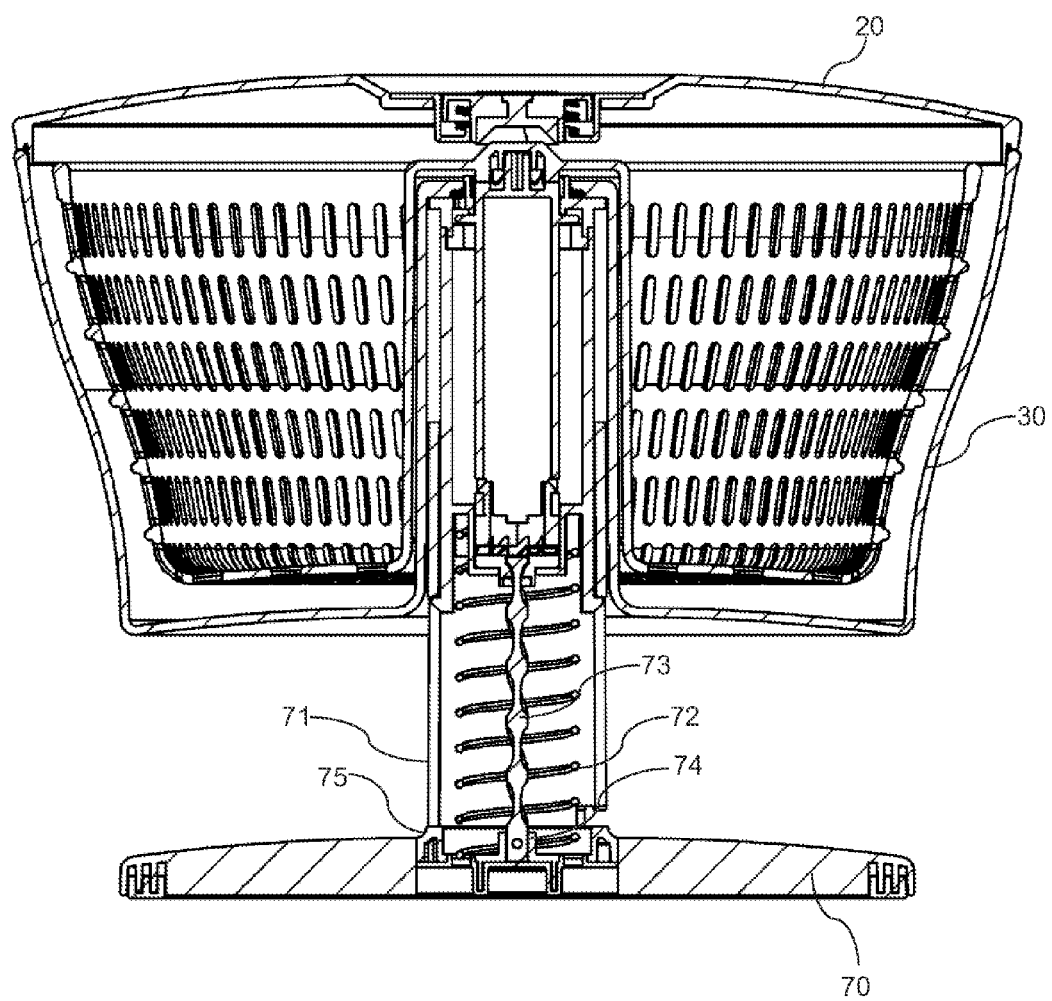
FIG. 5 is a sectional view of a preferred salad spinner, taken along section line 5-5 from FIG. 3.
Figure 6:
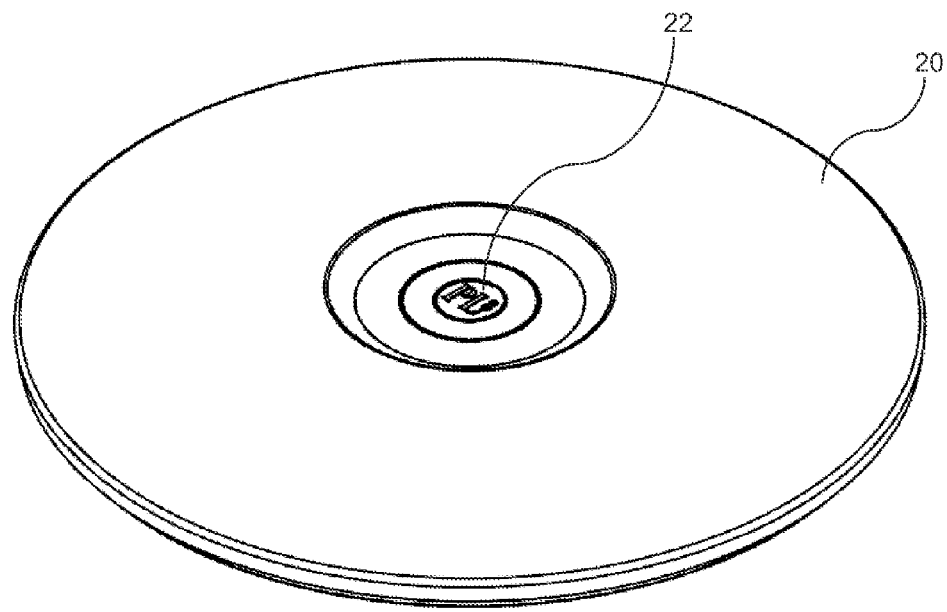
FIG. 6 is a top perspective view of a lid for use with a preferred salad spinner.
Figure 7:
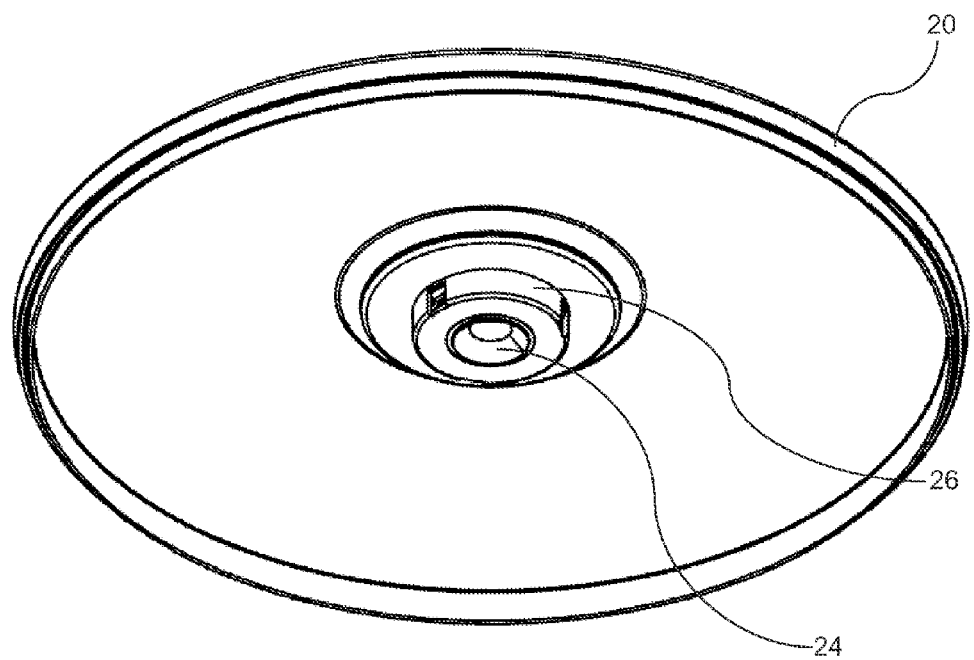
FIG. 7 is a bottom perspective view of a lid for a preferred salad spinner.
Figure 20:
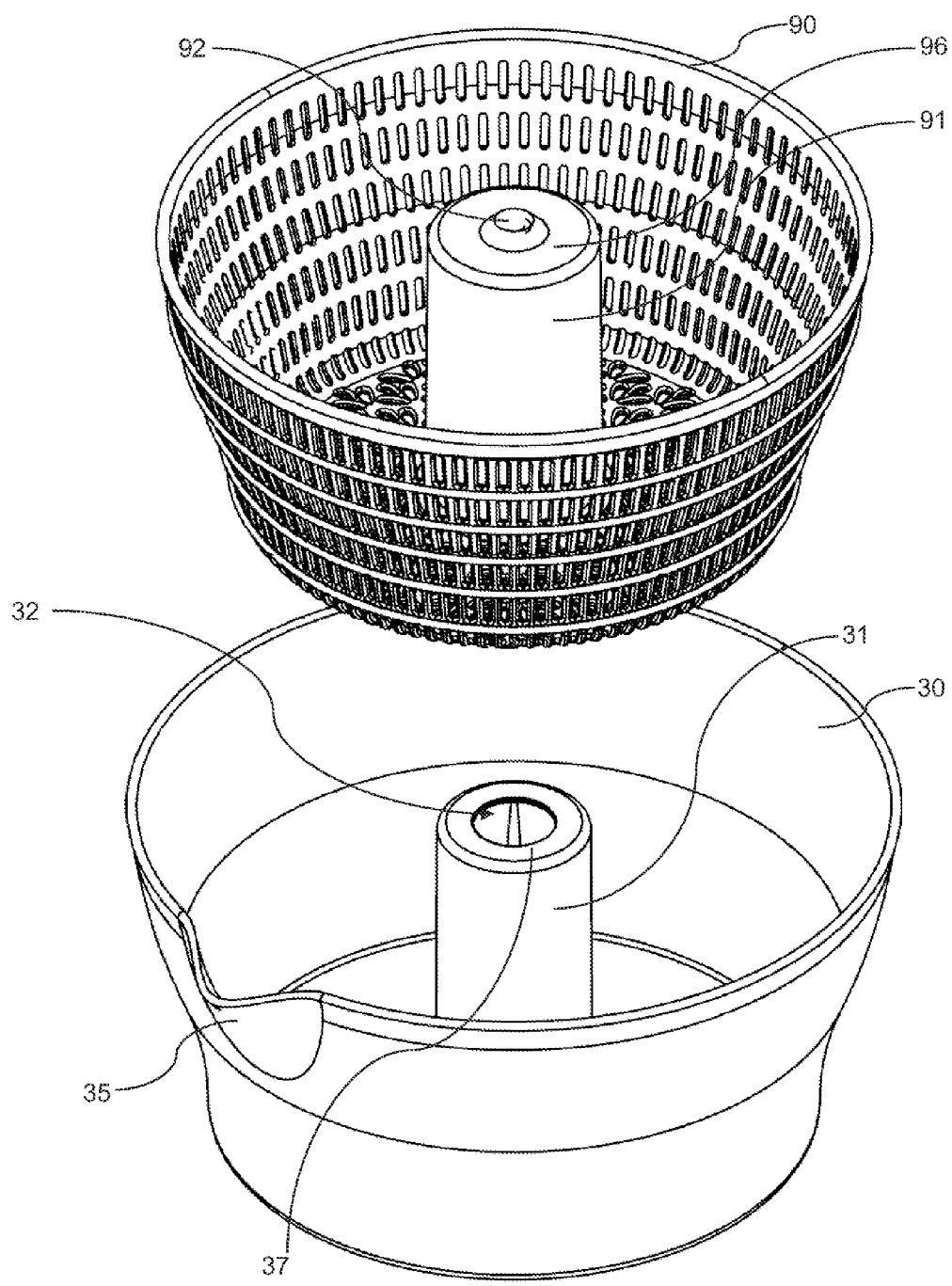
FIG. 20 is an exploded view of a basket and bowl for use with a preferred salad spinner.

A preferred salad spinner 10 as illustrated in the accompanying figures in which common reference numbers are used throughout. With reference to FIGS. 1 and 20, for example, the preferred salad spinner includes an outer bowl 30 and a lid 20. In the illustrated example, the bowl 30 includes a bottom and upwardly extending sidewalls defining an interior space, with a central bowl post 31 extending upwardly from the bottom of the bowl. The central bowl post 31 terminates at the top in a radially inward-directed flange forming a top shelf 37 which defines a central opening 32 at the top of the central bowl post.

In a preferred version of the invention, the outer bowl is formed from a clear plastic material such as is illustrated in some of the figures that follow. The bowl is supported by a base platform 70. In one version of the invention, the bowl includes a spout 35 formed along one portion of the rim of the bowl. The spout allows water collected in the bottom of the bowl during use to be poured out of the bowl without removing the lid.

The salad spinner includes an interior basket 90 configured with an integral central basket column or post 91, as illustrated for example in FIG. 20. The central basket post 91 is defined by upwardly extending sidewalls forming a hollow interior and terminating at an upper end in a generally horizontal top portion or cap 96 extending between the post sidewalls. The cap may include a raised central portion 92, configured for engaging a brake as discussed further below. A lower portion of the cap is preferably configured with gear teeth or other structures to engage a drive shaft for rotation of the basket.

The central column of the basket is sized and configured to receive and surround the central column of the bowl when the basket is positioned within the bowl for use. The central column of the basket is designed to be sufficiently larger than the central column of the bowl such that the basket can freely spin when placed within the bowl. As discussed further below, the drive shaft extends through the central opening in the central bowl post in order to engage the cap of the central basket post while not engaging the central bowl post.

The salad spinner also includes a base 40 having an upwardly extending pillar containing a drive as described further below, particularly with reference to FIGS. 9-19. The pillar of the base is sized and configured to be received within the central post of the bowl and to engage a top portion of the bowl and the basket in order to spin the basket within the bowl.

Figures 15, 16:
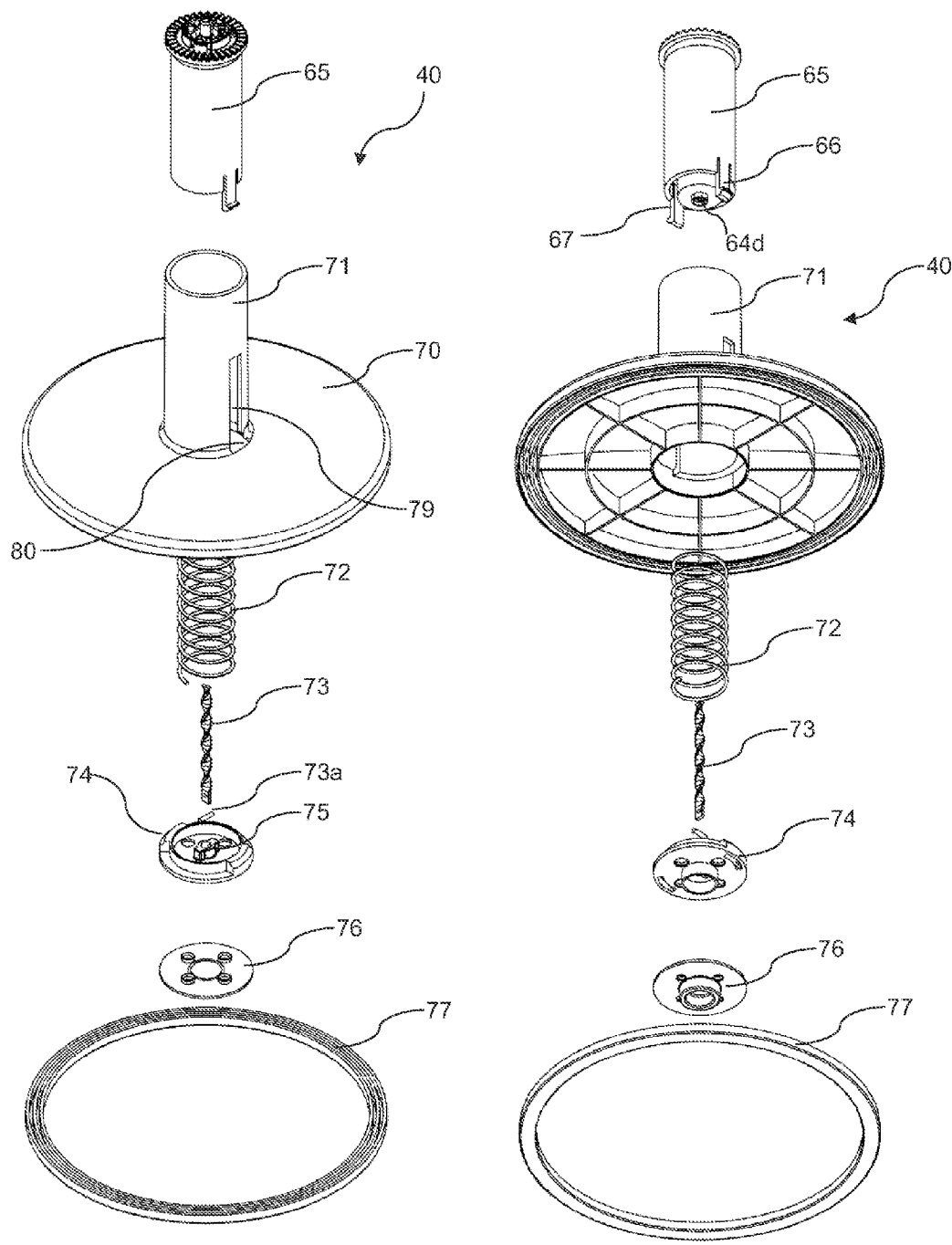
FIG. 15 is a top perspective exploded view of a base for use with a preferred salad spinner.
FIG. 16 is a bottom perspective exploded view of a base for use with a preferred salad spinner.
Figure 17:
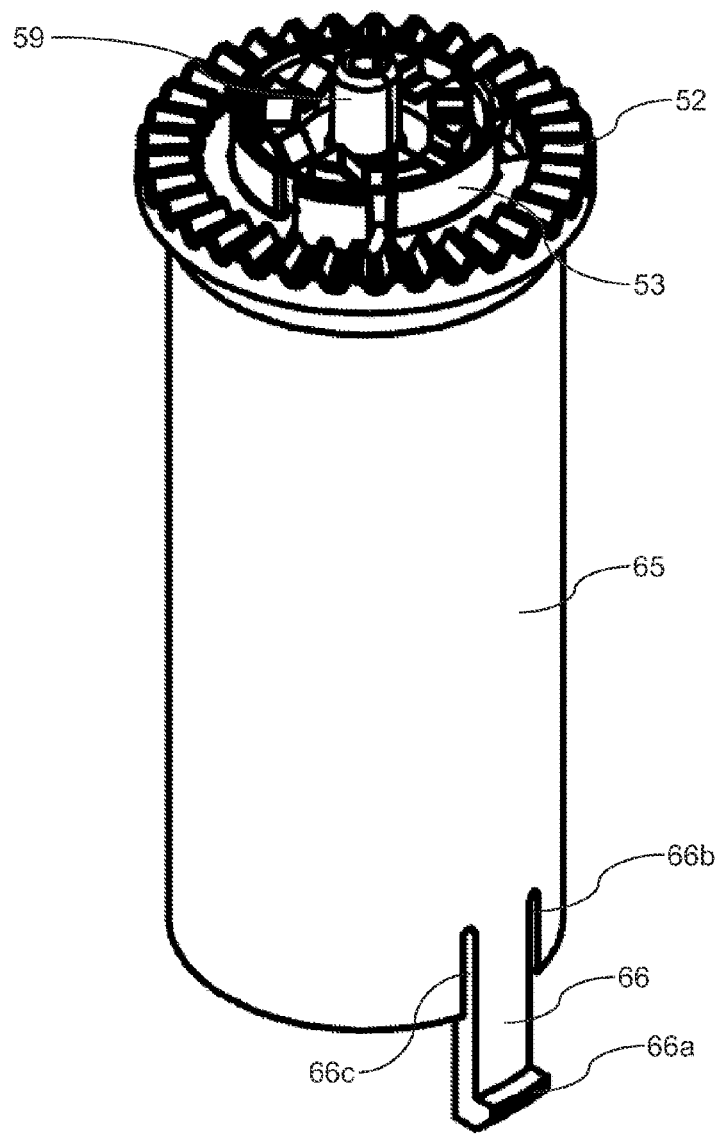
FIG. 17 is a perspective view of a piston for use with a preferred salad spinner.

The base 40 includes a lower support 70, which in the illustrated version of the invention is formed as a circular platform configured to lie substantially beneath the footprint of the bowl. The lower support 70 may include a section of nonskid material 77 to provide an improved grip of the lower support on a horizontal surface such as a countertop, as best seen in FIG. 16.

Figure 10:
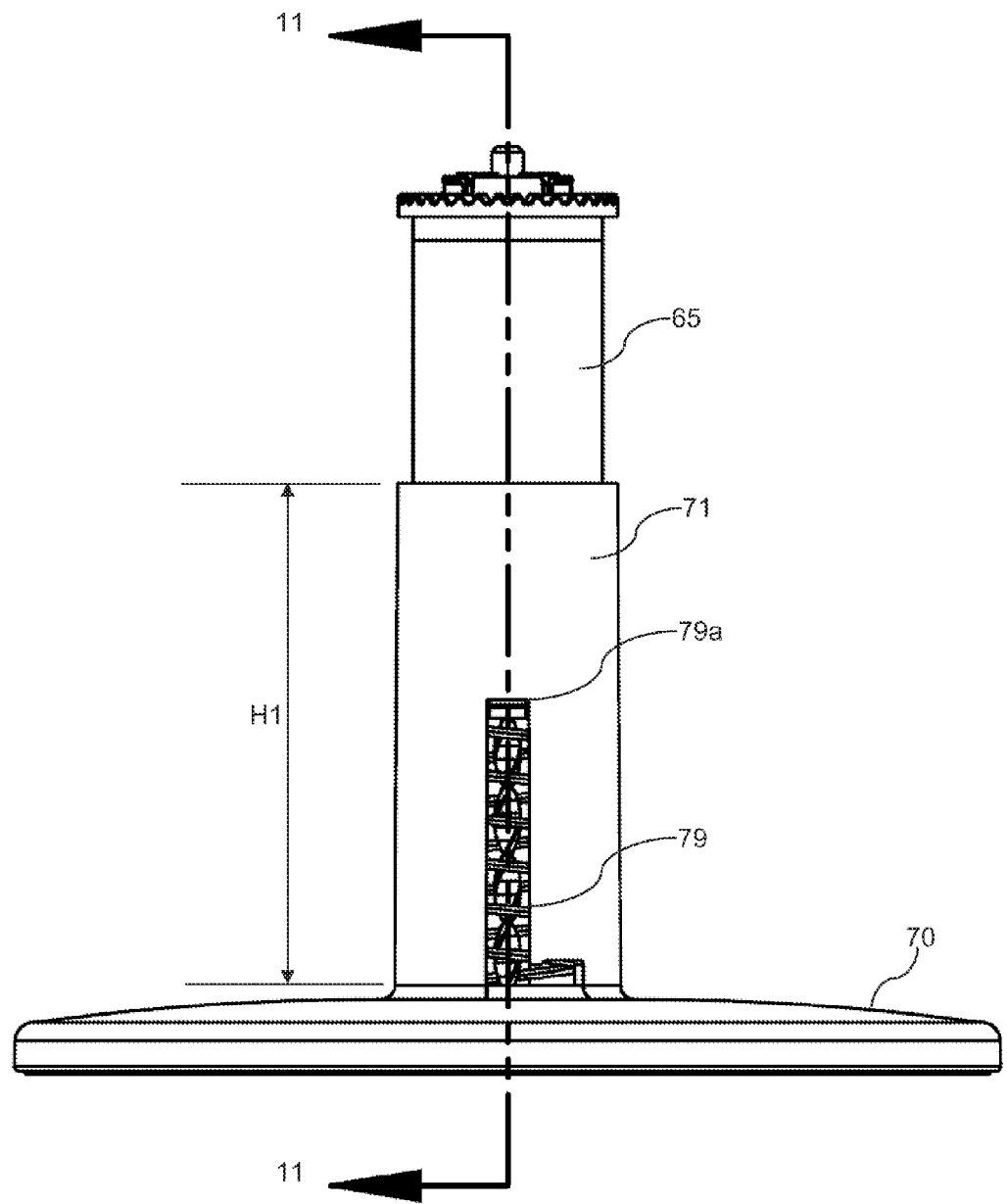
FIG. 10 is a front elevational view of a base for use with a preferred salad spinner, shown in an extended position and including section lines 11-11.

The lower support 70 transitions to a substantially cylindrical center pillar or column 71. The center column 71 includes a hollow interior and an open top, such as illustrated for example in FIG. 15. At two locations along diametrically opposed sidewalls forming the center column 71, an elongated slot 79 is formed. Each of the pair of elongated slots is positioned with one end of the slot 79a at a location beginning approximately midway along the height H1 of the central column 71 and extending to the bottom of the center column where the center column 71 joins the lower support 70, as best seen in FIG. 10. Though one slot 79 is visible in FIG. 10, a second slot is positioned diametrically opposite, beyond the internal spring and helical screw.

Figure 11:
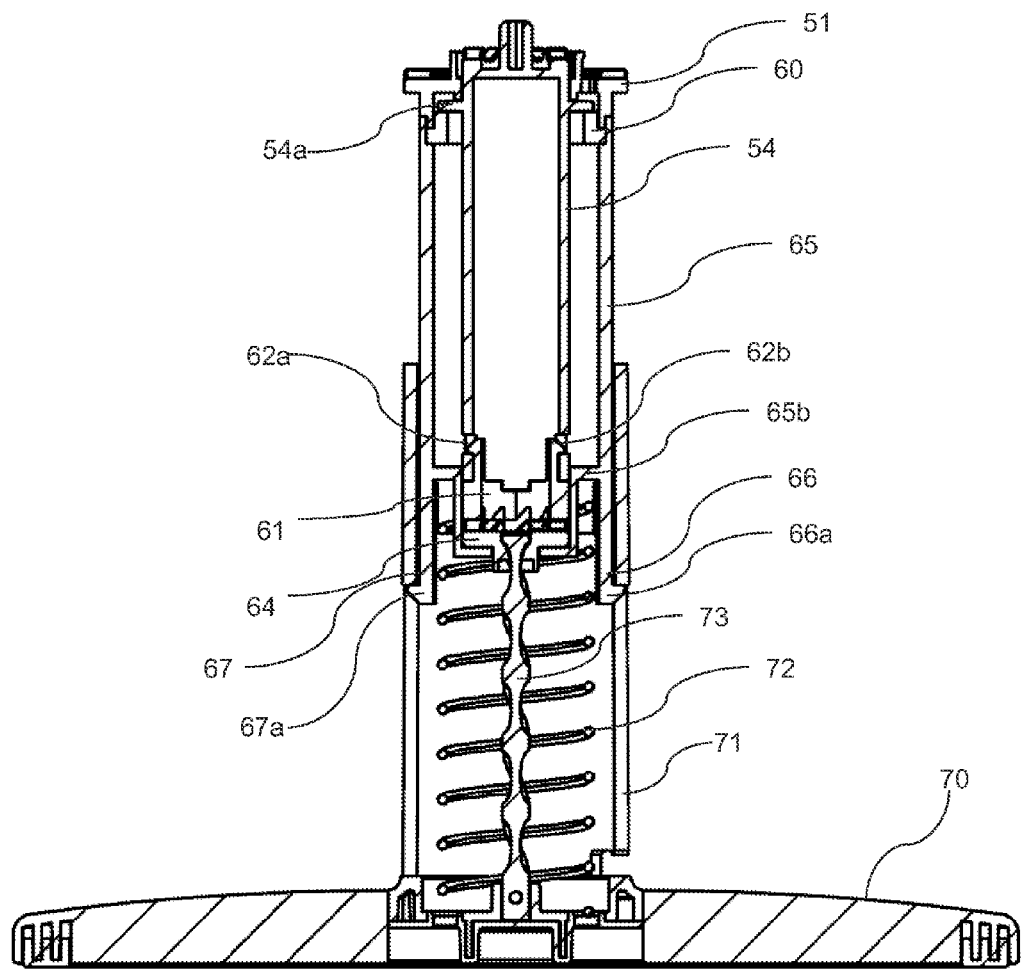
FIG. 11 is a sectional view of the base, taken along section line 11-11 from FIG. 10.
Figure 12:
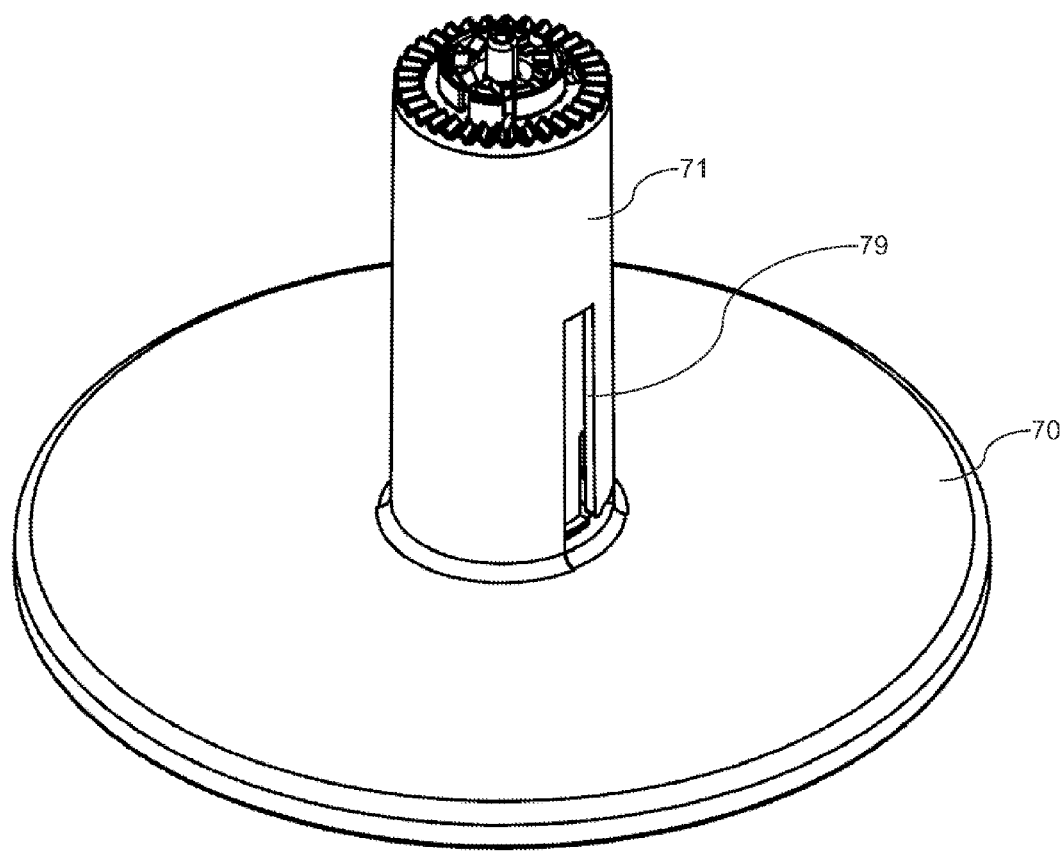
FIG. 12 is a top perspective view of a base for use with a preferred salad spinner, shown in a collapsed position.

As best seen in FIG. 11, a piston 65 is formed in a cylindrical shape configured to be received within the center column 71. The piston 65 includes a pair of downwardly extending arms 66, 67 terminating in outwardly radially extending tabs 66a, 67a. The arms and tabs are sized and positioned such that the tabs are received and retained within the elongated slots 79. In this fashion, the elongated slots 79 define a vertical path within which the tabs 66a, 67a may travel. Accordingly, the piston 65 is constrained to allow for upward and downward movement within the central column 71 along a distance defined by the length of the slots 79, and the piston 65 is further constrained against rotational movement as it travels up and down as a result of the tabs 66a, 67a extending through the slots 79.

Figure 13:
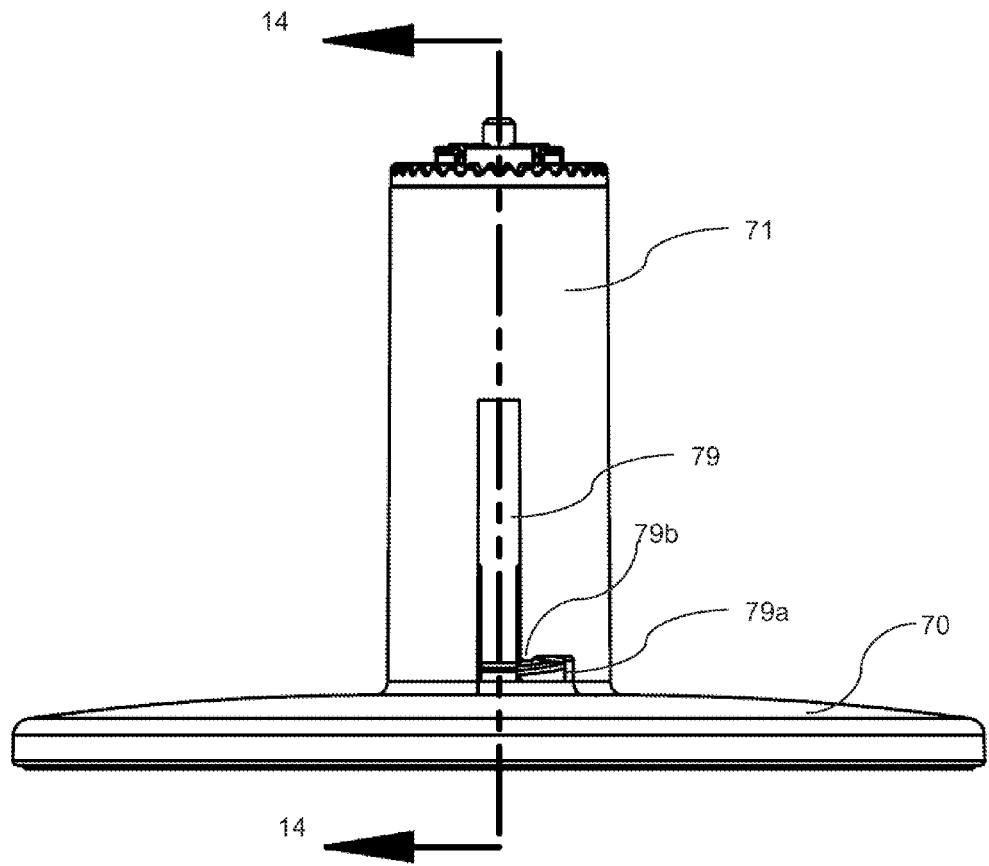
FIG. 13 is a front elevational view of a base for use with a preferred salad spinner, shown in a collapsed position and including section lines 14-14.
Figure 14:
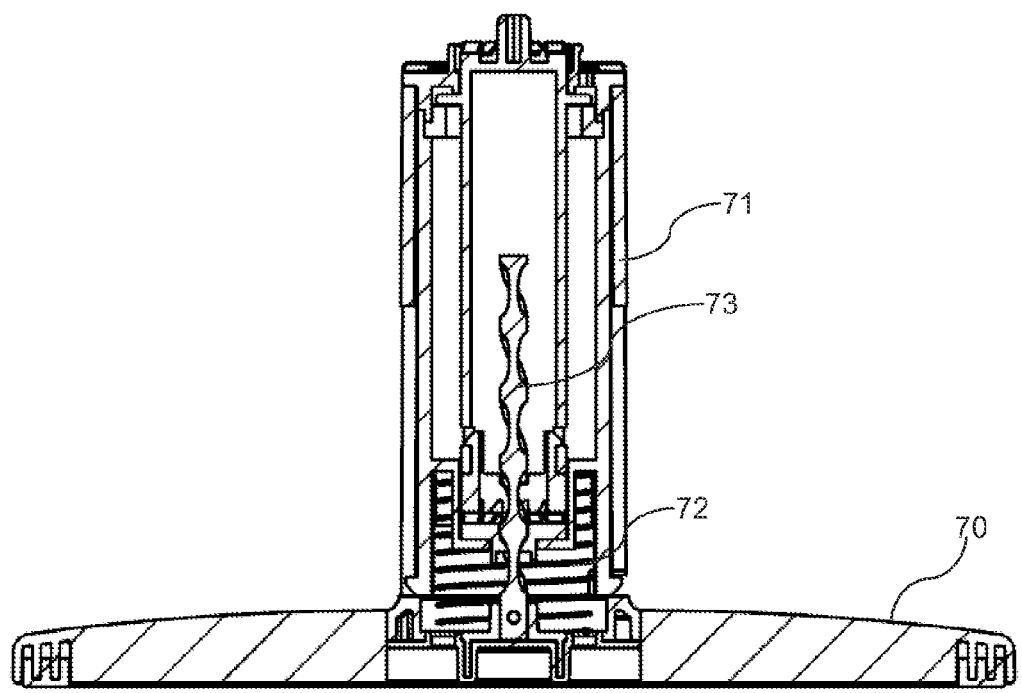
FIG. 14 is a sectional view of the base, taken along section line 14-14 from FIG. 13.

At the base of each of the elongated slots 79, the sidewall of the central column 71 further includes a short adjacent channel 79a positioned circumferentially offset from the elongated slot 79, such as illustrated in FIG. 13. Thus, the combination of the elongated slot 79 and the short adjacent channel 79a combine to form an L shaped opening on the sidewall of the central column 71. The short adjacent channel 79a is sized to receive one of the outwardly radially extending tabs 66a, 67a in order to restrict the piston 65 against vertical movement when the piston is rotated slightly to position the tabs within the short adjacent channels 79a. During ordinary use in which spinning the basket is desired, the piston 65 is able to travel up and down with the radial tabs 66a, 67a sliding within the elongated slots 79. By rotating the piston within the central column 71 a short distance in a counterclockwise direction (in the illustrated version), the piston and the radially extending tabs are constrained against vertical travel by the relatively short height of the adjacent channel 79a. It should be appreciated that the adjacent channel may be positioned next to the elongated slot in either the clockwise or counterclockwise direction. Likewise, a similar locking feature may be employed by positioning a short adjacent channel slot at the top of the elongated slot 79, or in yet another position.

In some versions of the invention, the arms 66, 67 formed on the piston 65 are produced with adjacent vertical sidecuts 66b, 66c (see, for example, FIG. 17) formed in the piston to provide additional flexibility so that the arms may more readily be deflected radially inward and outward from the piston. In addition, the elongated slots and adjacent side channel may contain a short downwardly extending tooth 79b, preferably at the apex of the L-shaped opening (see FIG. 13), to impede the rotation of the piston within the central column 71. As a result, the piston must travel downward slightly before it can be rotated into the locked or unlocked position. This feature thereby makes it more difficult to inadvertently lock or unlock the piston in the downward position.

Figures 18, 19:
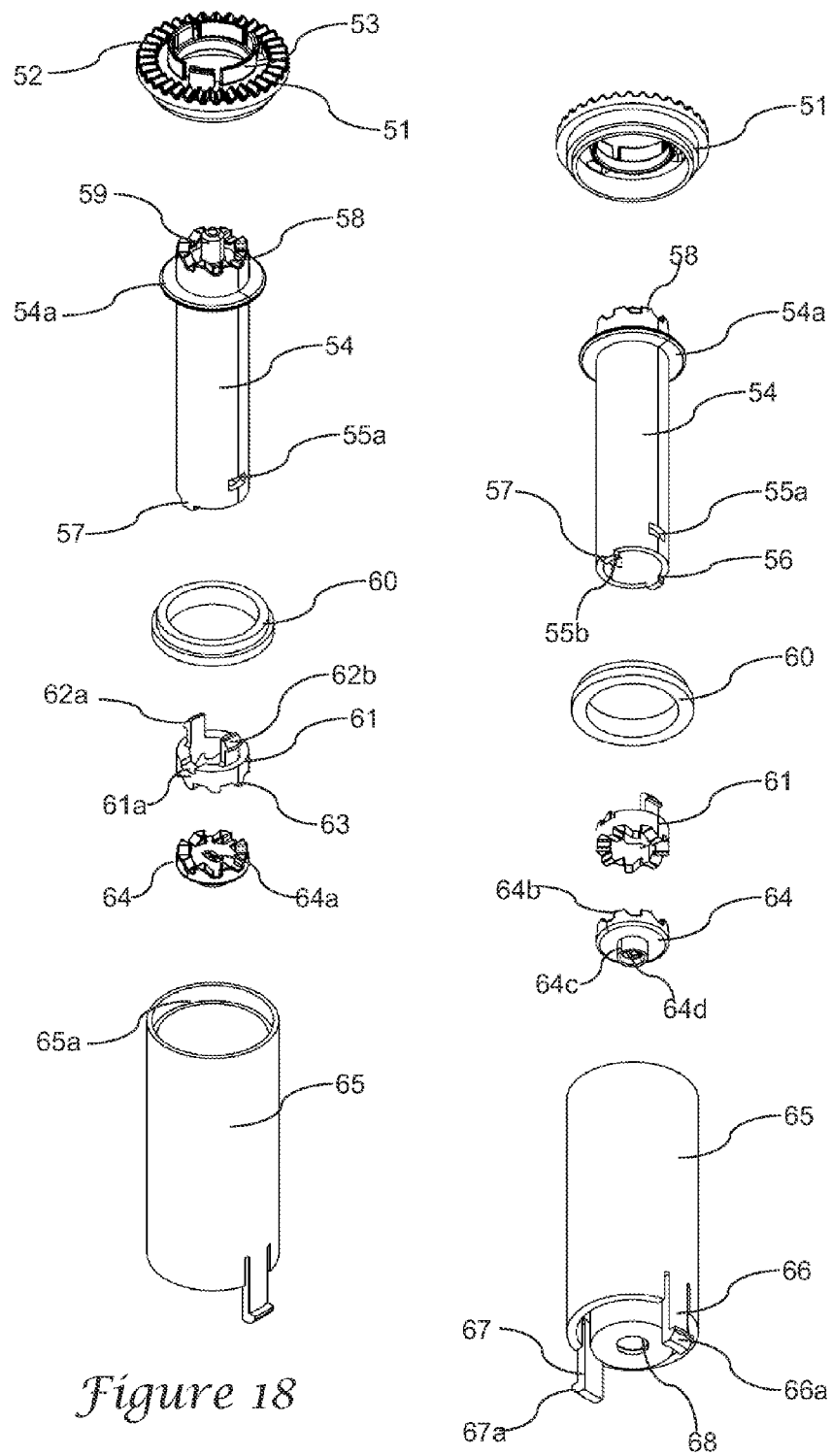
FIG. 18 is a top perspective exploded view of a piston structure for use with a preferred salad spinner.
FIG. 19 is a bottom perspective exploded view of a piston structure for use with a preferred salad spinner.

A hollow driveshaft 54 is formed in a generally cylindrical shape and is sized and configured to fit within the piston 65, as best seen in FIGS. 11, 18, and 19. In the illustrated example, the driveshaft 54 is formed with an outwardly extending annular flange 54a positioned near a top end of the driveshaft. The driveshaft further includes a central axial post 59 extending upward from the driveshaft and configured with a diameter which is substantially less than the diameter of the driveshaft in the illustrated version. The central post 59 of the driveshaft is surrounded by a plurality of circumferentially arranged ratchet teeth to form an upper driveshaft gear 58.

At the lower end of the driveshaft, axially opposite the central post and ratchet teeth, the driveshaft is configured with a pair of axially extending tabs 56, 57 positioned on diametrically opposite sides of the driveshaft. The lower end of the driveshaft is further configured with a pair of slots 55a, 55b positioned on diametrically opposite sides of the driveshaft. In the illustrated example, the slots 55a, 55b are positioned about the central axis of the driveshaft with an orientation that is rotated 90 degrees with respect to a position of the axially extending tabs 56, 57.

A lower driveshaft gear 61 is configured with a pair of upwardly extending arms 62a, 62b having outwardly radially extending fingers arranged to be received within the slots 55a, 55b formed in the lower end of the drive shaft. The lower driveshaft gear 61 further includes a pair of diametrically opposing channels 61a configured to receive the axially extending tabs 56, 57 formed in the lower end of the driveshaft. Accordingly, the lower driveshaft gear is snap-fit onto the lower end of the driveshaft in a fixed position with respect to the drive shaft. A bottom end of the lower driveshaft gear includes a set of lower driveshaft ratchet teeth 63.

An annular bearing 60 is seated on a shelf 65a formed on an upper portion of the interior sidewalls forming the piston 65. The annular flange 54a of the driveshaft rests atop the bearing 60 to restrict the driveshaft against vertical travel downward below the bearing with respect to the piston. A piston cap 51 sandwiches the annular flange of the driveshaft between the piston cap 51 and the annular bearing 60 to allow the driveshaft to rotate within the piston while being constrained against vertical movement in either the upward or downward direction. Preferably there is a gap provided between the piston cap 51 and the annular bearing 60 which allows for a limited amount of vertical travel, as described further below.

Figure 21:
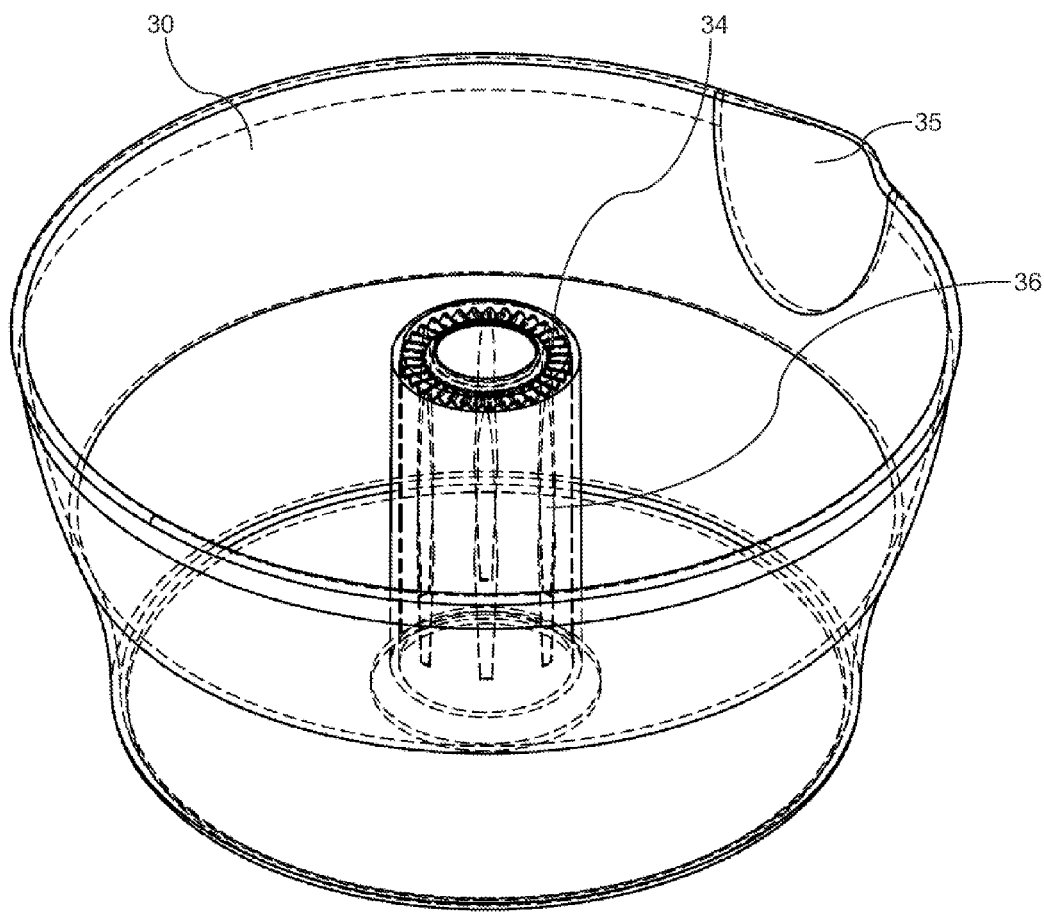
FIG. 21 is a top perspective view of a bowl for use with a preferred salad spinner.

The piston cap 51 includes a set of axially extending circumferentially arranged gear teeth 52 which engage a complementary set of downward-facing gear teeth 34 (see FIG. 21) positioned on the central post 31 of the bowl 30. Because the piston and piston cap are constrained against rotational movement, the engagement of the teeth 34 formed in the bowl with the gear teeth 51 formed on the piston cap serves to restrict the bowl against rotational movement when it is resting on the base 40.

The piston cap 51 further includes an axially extending circular flange 53, which in the illustrated version is formed as a plurality of flange sections separated by small gaps between sections. The flange 53 may further terminate in a radially outwardly extending shoulder which is configured to engage a rim formed on an inward facing top shelf 37 on the central post 31 of the bowl 30 (see FIG. 20). In the illustrated example, the central post of the bowl is formed with a substantially cylindrical shape and terminates the inward facing top shelf 37 forming a circular opening 32 on the central post 31. The set of gear teeth 34 are positioned on a lower surface of the top shelf 37, facing downward toward the bottom of the bowl.

When the bowl is positioned on the pillar forming the base, the gear teeth 34 of the bowl engage the gear teeth 51 of the piston cap. Likewise, the radially extending flange 53 (which may be configured as a plurality of flange sections arranged around a circle) extends through the opening 32 formed on the central post 31 of the bowl 30. The radially extending shoulders formed on the flanges 53 provide a slight impediment against removal of the bowl from the pillar. The use of a plurality of flange sections allows each of the flange sections to be somewhat flexible, thereby allowing the bowl to be removed upward upon application of a sufficient prying force.

The bottom of the piston 65 further includes a recess 68, which in the illustrated example is configured as a cylindrical depression having a central hole formed within the cylindrical depression (see FIG. 19). A driveshaft support gear 64 is formed with a plurality of upwardly extending ratchet teeth 64b and a downwardly extending stem 64c. The driveshaft support gear 64 is sized and configured to be seated within the recess 68 with the stem 64c extending into or through the central hole in the recess 68 so that the driveshaft support gear 64 may rotate within the recess 68.

A central rectangular slot 64a (see FIG. 18) extends through the piston gear and the stem in order to receive the helical gear, as described below.

As best seen in FIGS. 15 and 16, a helical gear 73 is attached to a lower mounting plate 74 having a central gear mount 75. In the illustrated example, a pin 73a extends through a hole formed in the central gear mount and the helical gear to secure the gear to the mounting plate. A lower end cap 76 is attached to the bottom of the mounting plate 74.

A coil spring 72 surrounds the helical gear 73 and is mounted within the pillar such that a lower end of the helical spring abuts the lower mounting plate 74 and the upper end of the coil spring abuts an inward shoulder 65b formed on an interior sidewall of the piston 65. The upper portion of the spring 72 is further trapped in a space defined between the outer sidewall of the piston and a vertical wall defined by the recess 68 formed in the bottom of the piston. The spring is configured to provide a force which urges the piston upward and away from the base platform 70. The piston may be moved downward into the central pillar 71 upon the application of a force sufficient to compress the spring. In use, a user pushes downward against the salad spinner lid to compress the spring and cause a rotation of the basket, then releases the bowl to allow the spring to push the bowl upward again so that the downward force can be applied again if desired.

The upper end of the helical gear extends through the rectangular slot 64d formed in the piston gear 64. As described above, the driveshaft 54 is constrained against vertical movement with respect to the piston 65. Because the driveshaft support gear 64 is seated within a recess formed in the lower end of the piston, with the driveshaft having a lower driveshaft gear 61 and its lower driveshaft gear ratchet teeth 63 engaged with the driveshaft support gear 64 and its ratchet teeth 64b, the piston gear and the lower driveshaft gear include ratchet teeth which are continually engaged when a downward force is applied. As the piston moves upwardly and downwardly within the central pillar 71, the piston is constrained against rotational movement. Meanwhile, the piston gear 64 rotates about the helical gear 73 because of the interaction of the central horizontal slot formed in the piston gear. The rotation of the piston gear causes rotation of the driveshaft together with the piston gear. Consequently, downward movement of the piston results in rotation of the driveshaft.

Figure 9:
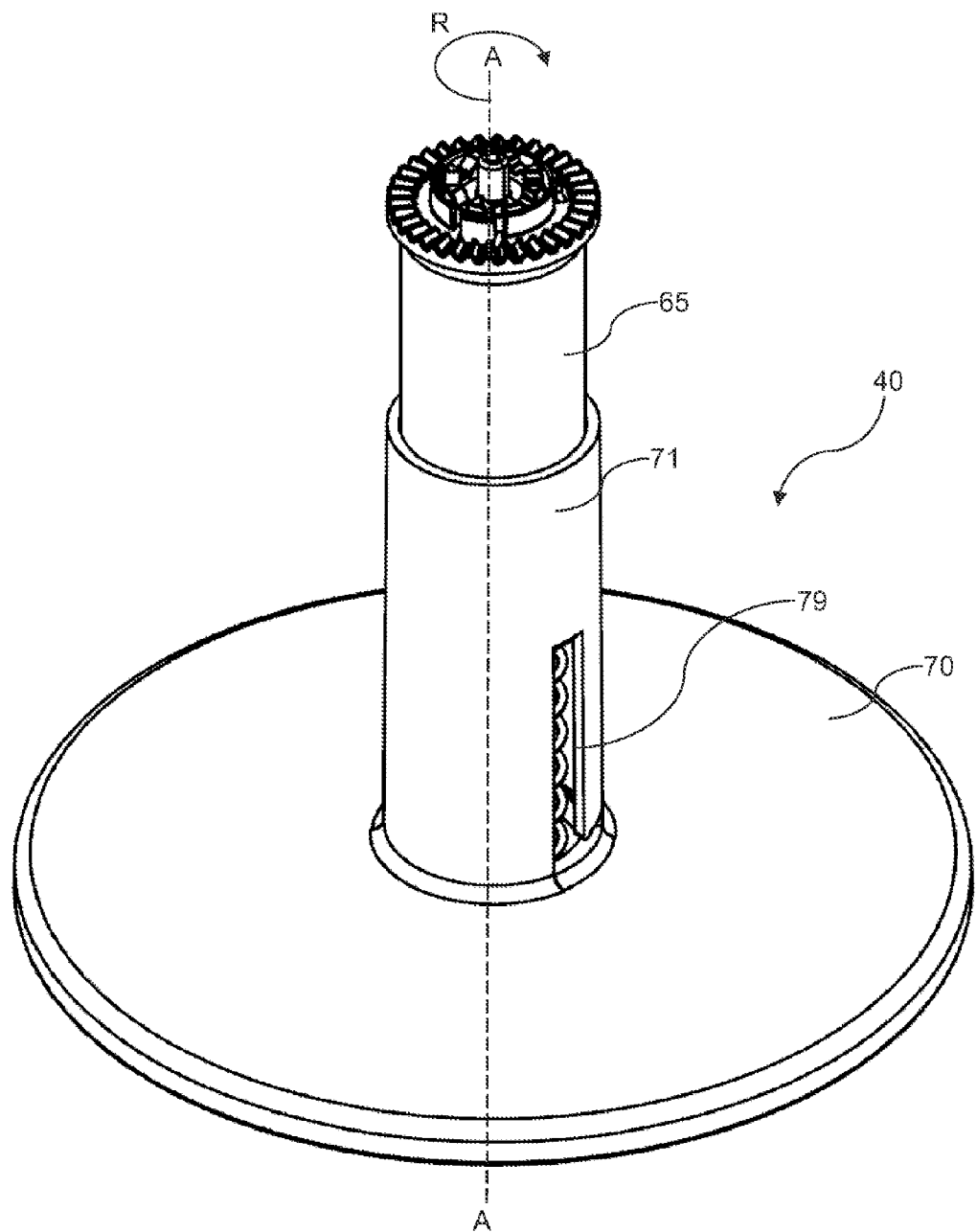
FIG. 9 is a top perspective view of a base for use with a preferred salad spinner, shown in an extended position.

As indicated in FIG. 9, the piston 65 is configured to move axially along axis A-A with respect to the pillar 71. In FIG. 9, the piston is shown in an extended position, while in FIG. 12 it is shown in a retracted position. Likewise, the driveshaft is configured to rotate in a direction R about the central axis A as the piston moves downward.

Figure 22:
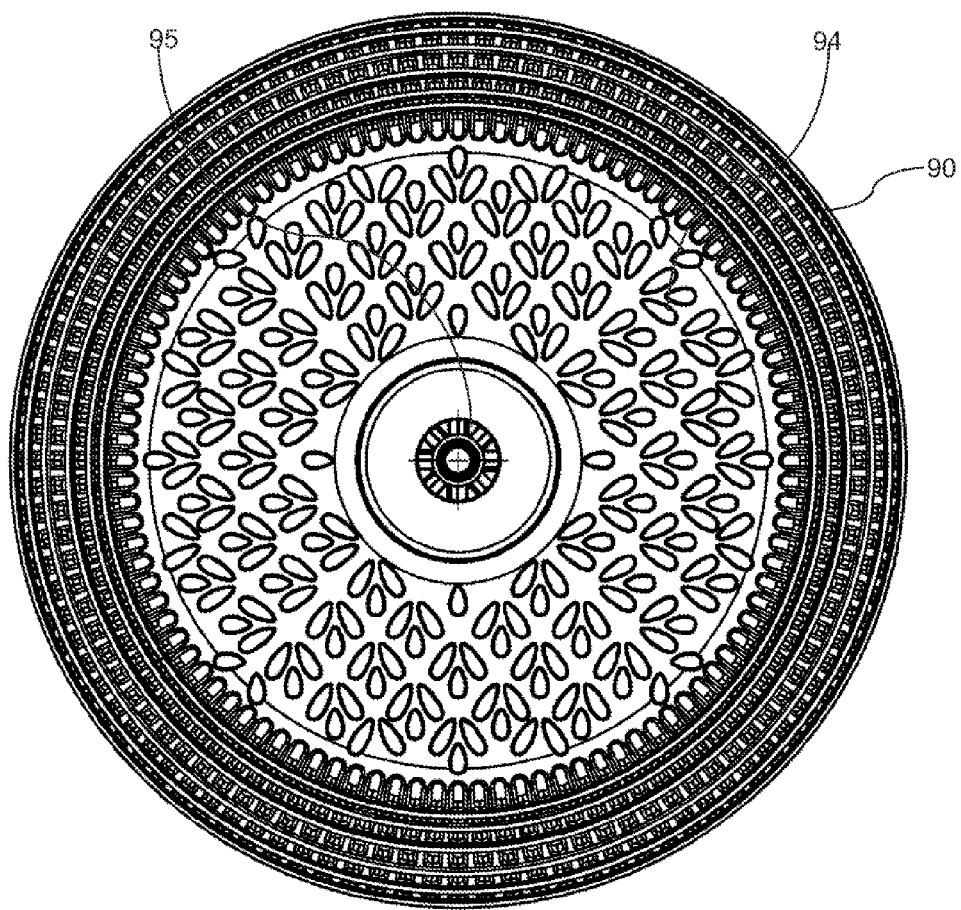
FIG. 22 is a bottom plan view of a basket for use with a preferred salad spinner.
Figure 23:
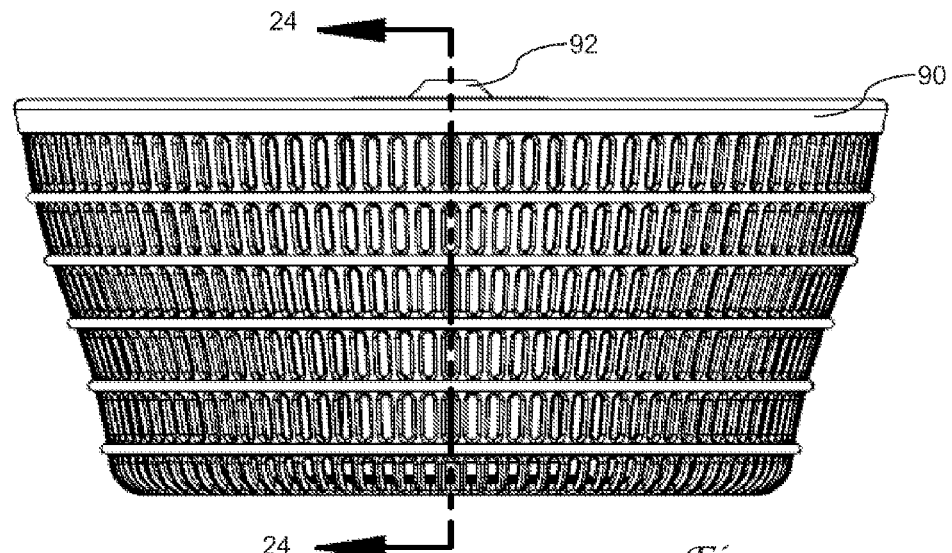
FIG. 23 is a front elevational view of a basket for use with a preferred salad spinner, including section line 24-24.

When the bowl 30 is seated on the top of the piston cap, the gear teeth formed on the outermost portion of the piston cap prevent rotation of the bowl. The driveshaft, including the ratchet teeth 58 and central post 59 extend through the opening 32 formed in the central post 31 of the bowl. The basket 90 includes a central basket post 91 and a horizontal basket post cap 96 having an interior cylindrical guide for receiving the central post 59. The horizontal basket post cap includes a set of downwardly facing basket gear teeth 95 (see FIG. 22) which are sized and configured to engage the ratchet teeth 58 formed in the driveshaft. Thus, rotation of the driveshaft causes rotation of the basket by the interaction of the basket gear teeth 95 and the driveshaft ratchet teeth 58. In the illustrated examples, the basket includes a plurality of through holes 94, which may be provided on the sidewalls and the floor of the basket.

The lid 20 is sized to engage the rim of the bowl and to cover the bowl. In one example of the invention, the lid is somewhat separated from the basket so that the basket may freely spin within the bowl. As described above, the downward force applied to the bowl will in turn apply a downward force to the piston cap. The downward force on the bowl allows the basket to spin within the bowl without imparting a frictional force on the basket. Similarly, because the lid is separated from the basket, but is engaged with the bowl, applying a downward force on the lid produces a downward force on the bowl and the piston.

When the downward force is removed, the helical spring pushes the bowl upward again. Likewise, when the downward force is removed (either because the bowl is moved upward or because it is stationary), a spinning basket would come to a stop if the various gears did not include a ratchet teeth feature to allow for one-way operation. As best seen in the sectional view of the base in FIG. 11, a small gap is provided between the bearing 60 and the piston cap 51, thereby allowing for a small amount of vertical travel of the driveshaft with respect to the piston. This small amount of vertical travel allows for one-way driving of the basket in the bowl. In one example of the invention, when a downward force is applied, the teeth of the piston gear and the lower driveshaft gear are engaged and the rotation of the piston gear by the helical gear causes rotation of the driveshaft. At the end of the path of travel, and when the downward force is removed or the piston is urged upward again, the ratchet teeth of the piston gear and lower driveshaft gear slide over one another thereby allowing continued rotational movement of the driveshaft and the basket in the driving direction even while the piston gear reverses direction. Similarly, at the end of the upward path of travel the piston gear and lower drive shaft gear slide over one another to allow for free rotation of the drive shaft. The upper drive shaft teeth 58 and basket gear teeth 95 are preferably also ratchet teeth which engage for driving only in one rotational direction but which slide over one another in the opposite direction. It should be appreciated that the driving direction of the driveshaft may be reversed by reversing the orientation of the ratchet on the respective gears.

Figure 8:
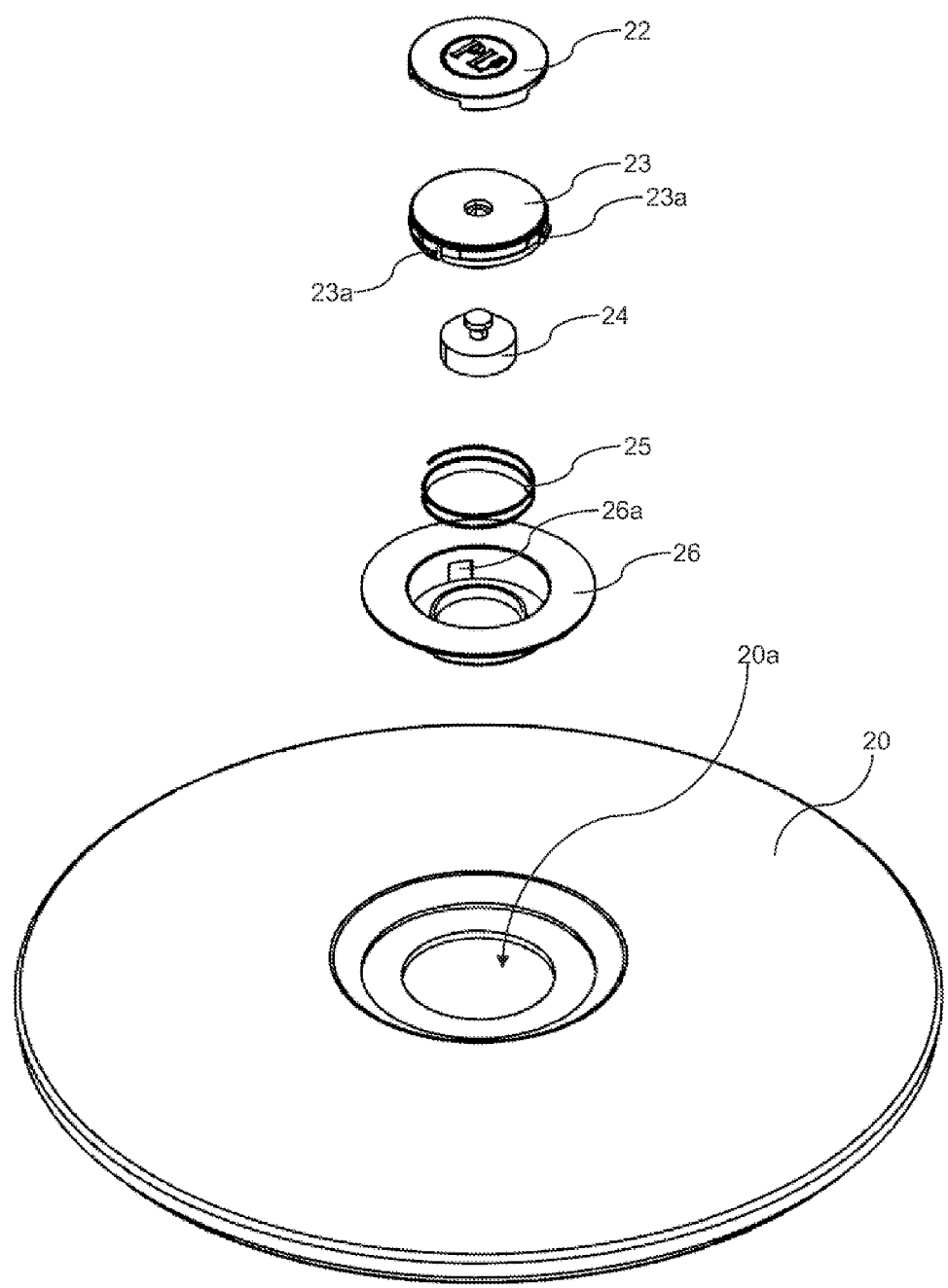
FIG. 8 is an exploded view of a lid for a preferred salad spinner.
Figure 24:
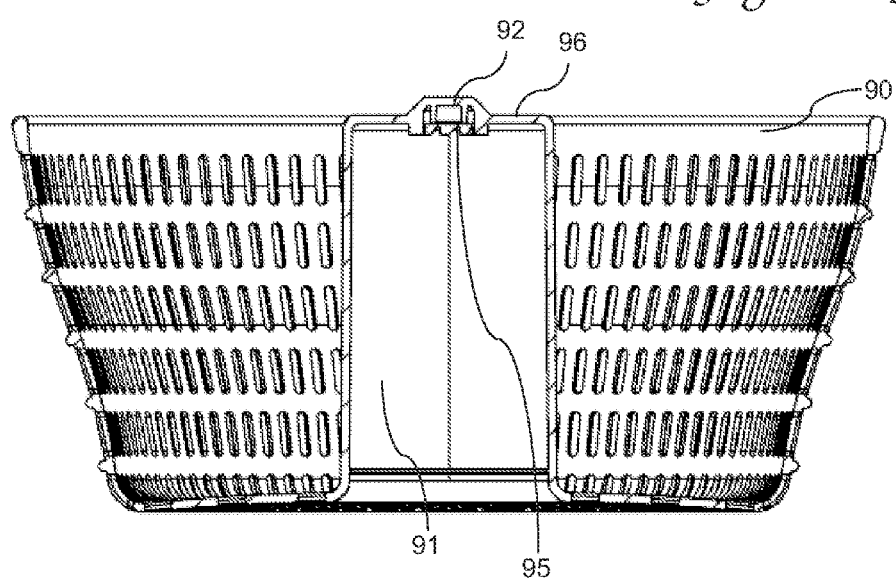
FIG. 24 is a sectional view of a basket for use with a preferred salad spinner, taken along section line 24-24 in FIG. 23.

In the preferred example of the invention, the lid further includes a brake. In one example, as best seen in FIG. 8, the brake is positioned in a central location within the lid. As illustrated, a helical brake spring 25 is seated within a cup 26 having a generally cylindrical interior space and mounted within an opening formed on a central portion of the lid. A frictional brake pad 24 is attached to a cap 23 by a stem. The cap 23 includes a plurality of radial projections 23a that are snap-fit within corresponding recesses 26a formed in the vertical sidewall of the cup 26. The recesses are formed to allow for a limited amount of vertical movement of the cap 23, and therefore the brake pad 24, within the seat of the cup 26. A cover 22 attaches to the top portion of the cap. The spring 25 urges the cap 23 and brake pad upward, away from the top of the basket. By pressing downward against the cover 22, the cap 23 and brake pad 24 are moved downward, compressing the spring 25, so that the brake pad 24 frictionally engages a raised central portion 92 formed within the cap 96 of the center post 91 of the basket (see FIGS. 20, 24). The application of the frictional force serves to slow and eventually stop the rotation of the basket within the bowl. By releasing the pressure against the cover 22, the spring 25 urges the brake pad, cap, and cover upward again, away from the center post of the basket.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A salad spinner, comprising:
    a bowl having a bottom and upwardly extending sidewalls defining an interior space, with a central bowl post extending upwardly from the bottom of the bowl and into the interior space;
    a basket having a central basket post extending upwardly from a bottom of the basket, the central basket post defining a hollow interior and terminating in a cap enclosing the hollow interior, the central basket post being configured to surround a portion of the central bowl post when the basket is positioned within the bowl;
    a base removably attachable to the bowl, the base having a pillar defining a central axis and configured to be received within the central bowl post, the base further having a helical screw positioned within the pillar, wherein the bowl and the basket are supported by the pillar when the base is attached to the bowl;
    a piston positioned on the pillar and configured for axial movement between a retracted position and an extended position with respect to the pillar, the piston further engaging the bowl for axial movement of the bowl with the piston as the piston moves between the retracted position and the extended position;
    a driveshaft carried by the piston and engaging the helical screw for rotational movement of the drive shaft with respect to the piston when the piston moves axially along the helical screw between the retracted position and the extended position, the drive shaft further engaging the cap of the central basket post;
    whereby movement of the bowl with the piston between the extended position and the retracted position causes rotation of the driveshaft and rotation of the basket within the bowl.

2. The salad spinner of claim 1, further comprising:
    a set of basket gear teeth formed on the cap and extending into the hollow interior of the central basket post; and
    a set of driveshaft gear teeth formed on the driveshaft, the drive shaft gear teeth being configured to engage the basket gear teeth to rotate the basket with the drive shaft.

3. The salad spinner of claim 2, wherein the basket gear teeth and the driveshaft gear teeth are configured as ratchet teeth.

4. The salad spinner of claim 1, further comprising a spring positioned within the pillar and engaging the piston, the spring being configured to bias the piston on the extended position.

5. The salad spinner of claim 4, further comprising an elongated slot formed in the pillar and a radially outward extending tab formed on the piston, the tab being received within the elongated slot for movement of the tab within the elongated slot, wherein the elongated slot and the tab combine to define a path of travel of the piston between the extended position and the retracted position.

6. The salad spinner of claim 4, further comprising a channel extending transversely to the elongated slot, wherein the piston is rotatable to move the tab into the channel to lock the piston in the retracted position.

7. The salad spinner of claim 1, further comprising:
an inwardly-directed flange positioned on the upper end of the central bowl post, the inwardly-directed flange terminating in a central opening configured to allow the drive shaft to extend through the central opening;
a set of circumferentially arranged piston gear teeth positioned on the piston; and
a set of bowl pillar teeth positioned on the inwardly-directed flange, the piston gear teeth being configured to engage the bowl pillar teeth.

8. The salad spinner of claim 7 further comprising an elongated slot formed in the pillar and a radially outward extending tab formed on the piston, the tab being received within the elongated slot for movement of the tab within the elongated slot, wherein the elongated slot and the tab combine to define a path of travel of the piston between the extended position and the retracted position, and further wherein the engagement of the tab within the elongate slot restricts the piston against rotational movement within the pillar, whereby the engagement of the piston gear teeth with the bowl pillar teeth restrict the bowl against rotational movement with respect to the pillar.

9. The salad spinner of claim 8, further comprising an elongated slot formed in the pillar and a radially outward extending tab formed on the piston, the tab being received within the elongated slot for movement of the tab within the elongated slot, wherein the elongated slot and the tab combine to define a path of travel of the piston between the extended position and the retracted position.

10. The salad spinner of claim 7, further comprising:
a set of lower driveshaft ratchet gear teeth attached to the driveshaft; and
a driveshaft support gear seated in the piston, the driveshaft support gear having a set of driveshaft support gear ratchet teeth which engage the lower driveshaft ratchet gear teeth for one-way driving movement of the driveshaft within the piston.

11. The salad spinner of claim 1, wherein the base further comprises a platform, the pillar extending upward from the platform.

12. The salad spinner of claim 1, further comprising a lid removably attachable to the bowl.

13. The salad spinner of claim 12, wherein the lid further comprises a brake, the brake being operable by a user between a disengaged position in which the brake is separated from the basket and an engaged position in which the brake is in contact with the basket.

14. The salad spinner of claim 13, wherein the brake comprises a brake pad supported by the lid and a spring biasing the brake pad in the disengaged position.

15. The salad spinner of claim 14, wherein the cap further comprises a raised central portion configured to contact the brake pad in the engaged position.

16. A salad spinner, comprising:
a bowl having a bottom and upwardly extending sidewalls defining an interior space, with a central bowl post extending upwardly from the bottom of the bowl and into the interior space, the central bowl post having an inwardly-directed flange positioned on the upper end of the central bowl post, the inwardly-directed flange terminating in a central opening;
a basket sized and configured to fit within the bowl;
a base removably attachable to the bowl, the base having a pillar configured to be received within the central bowl post, the base further having a helical screw attached to the base and positioned within the pillar, wherein the bowl and the basket are supported by the pillar when the base is attached to the bowl;
a piston telescopically attached to the pillar and configured for axial movement between a retracted position and an extended position with respect to the pillar, the piston further engaging the bowl for movement of the bowl with the piston as the piston moves between the retracted position and the extended position;
a driveshaft carried by the piston and engaging the helical screw for rotational movement of the drive shaft with respect to the piston when the piston moves axially along the helical screw between the retracted position and the extended position, the drive shaft further extending through the central opening of the central bowl post and mechanically coupled to the basket;
whereby movement of the bowl with the piston between the extended position and the retracted position causes rotation of the driveshaft and rotation of the basket within the bowl.

17. The salad spinner of claim 16, further comprising a spring positioned within the pillar and engaging the piston, the spring being configured to bias the piston on the extended position.

18. The salad spinner of claim 17, further complementary surfaces formed on the piston and the pillar to define a path of travel of the piston between the extended position and the retracted position.

19. The salad spinner of claim 18, wherein the basket further comprises a central basket post terminating in a cap, the central basket post being configured to surround a portion of the central bowl post when the basket is positioned within the bowl.

20. The salad spinner of claim 19, wherein the driveshaft engages the cap to cause rotation of the basket within the bowl.

* * * * *